United States Patent
Brito et al.

(10) Patent No.: US 11,265,331 B2
(45) Date of Patent: Mar. 1, 2022

(54) BLUETOOTH HUB DEVICE MEDIATING CONNECTIONS BETWEEN MOBILE DEVICE AND CONTROLLED DEVICE

(71) Applicant: Palo Alto Research Center Incorporated, Palo Alto, CA (US)

(72) Inventors: Alejandro E. Brito, Mountain View, CA (US); Shantanu Rane, Menlo Park, CA (US); Eric A. Bier, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 245 days.

(21) Appl. No.: 16/601,767

(22) Filed: Oct. 15, 2019

(65) Prior Publication Data

US 2021/0112069 A1    Apr. 15, 2021

(51) Int. Cl.
| | | |
|---|---|---|
| *H04L 29/06* | (2006.01) | |
| *G06F 3/12* | (2006.01) | |
| *H04W 4/80* | (2018.01) | |
| *H04W 12/08* | (2021.01) | |
| *H04W 4/06* | (2009.01) | |
| *H04W 48/14* | (2009.01) | |
| *H04W 12/50* | (2021.01) | |
| *H04W 12/63* | (2021.01) | |

(52) U.S. Cl.
CPC .......... *H04L 63/107* (2013.01); *G06F 3/1222* (2013.01); *G06F 3/1292* (2013.01); *H04W 4/06* (2013.01); *H04W 4/80* (2018.02); *H04W 12/08* (2013.01); *H04W 12/50* (2021.01); *H04W 12/63* (2021.01); *H04W 48/14* (2013.01)

(58) Field of Classification Search
CPC .......................... H04W 12/00503; H04W 4/80
See application file for complete search history.

(56) References Cited

U.S. PATENT DOCUMENTS

| | | | |
|---|---|---|---|
| 8,014,392 | B2 | 9/2011 | Smith |
| 9,872,128 | B2 * | 1/2018 | Lou ........................ H04L 67/16 |
| 10,257,708 | B1 * | 4/2019 | Kamkar ............ G07C 9/00571 |

FOREIGN PATENT DOCUMENTS

| | | |
|---|---|---|
| EP | 3288296 A1 | 2/2018 |
| KR | 101901671 | 9/2018 |

OTHER PUBLICATIONS

Townsend, "Introduction to Bluetooth Low Energy", Feb. 1, 2019, 9 pages.

\* cited by examiner

*Primary Examiner* — Tuan H Nguyen
(74) *Attorney, Agent, or Firm* — Mueting Raasch Group

(57) ABSTRACT

A multifunction printer connects to a controlled device via a proximity network link. The multifunction printer is connected as a master of the controlled device. The multifunction printer connects with a mobile device via a Bluetooth link, such that the mobile device is connected as a master of the multifunction printer. The mobile device is authenticated to determine credentials and access permissions relative to the controlled device. The mobile device's access to the controlled device is controlled from the multifunction printer via the Bluetooth link based on the credentials and access permissions.

20 Claims, 5 Drawing Sheets

BLUETOOTH HUB DEVICE MEDIATING CONNECTIONS BETWEEN MOBILE DEVICE AND CONTROLLED DEVICE

SUMMARY

The present disclosure is directed to a networked "hub device" that mediates connections between a mobile device and a controlled device by means of a wireless personal area network. In one embodiment, a hub device (e.g., a multi-function printer) connects to a controlled device via a proximity network link. The hub device is connected as a master of the controlled device. The hub device connects with a mobile device via a Bluetooth link, such that the mobile device is connected as a master of the hub device. The mobile device is authenticated to determine credentials and access permissions relative to the controlled device. The mobile device's access to the controlled device is controlled from the hub device via the Bluetooth link based on the credentials and access permissions. The hub device provides mechanisms to switch between master and slave modes, or to maintain simultaneous master and slave connections depending upon which entities it is communicating with.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
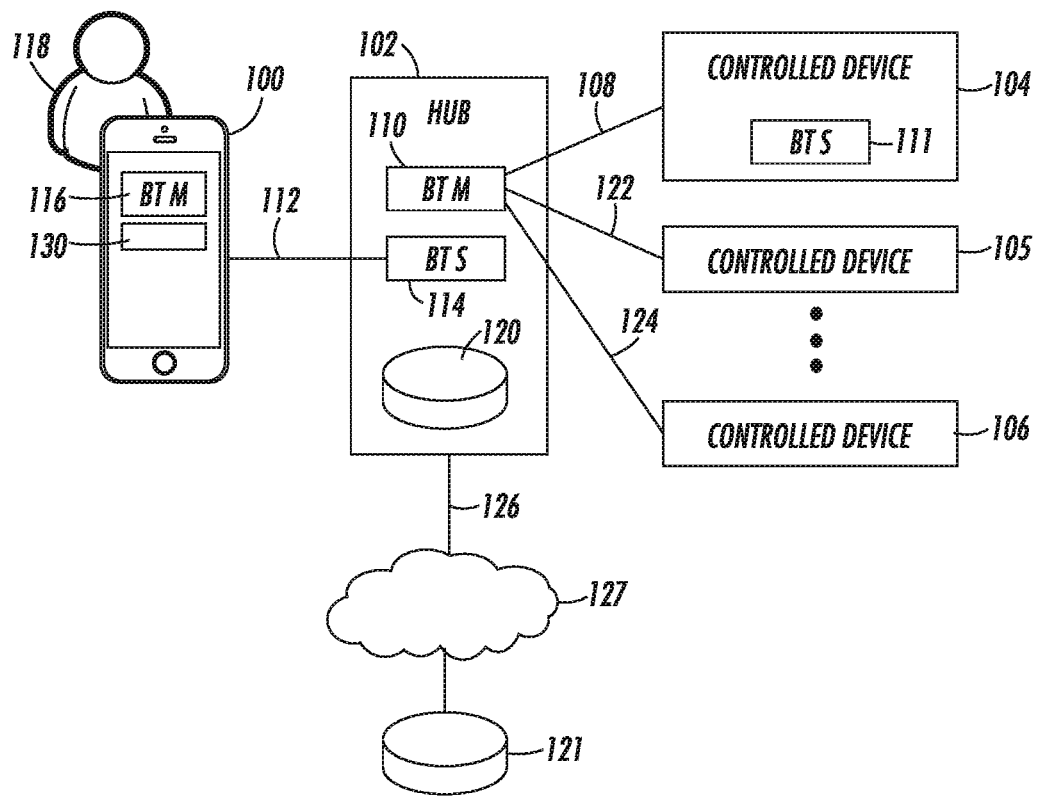
FIG. 1 is a block diagram of a system according to an example embodiment.

The present disclosure is generally related to ad-hoc networking using wireless personal area networks (WPAN). This includes technologies such as Bluetooth®. Generally, this technology allows users to quickly and seamlessly establish a wireless communications channel between two devices, typically for a limited purpose. A "hub device" uses WPAN technology to enable a mobile device to communicate with one or more controlled devices. We particularly consider embodiments that extend the range of applications of the hub device. An example of a hub device is a Multi-Function Printer (MFP) situated in an office. Though its typical functions are printing scanning, and copying, the present invention allows a user with a mobile phone to securely communicate with other devices (e.g., sensors, actuators and controllers) located in close proximity to the MFP. While embodiments described herein may be shown using Bluetooth for ad-hoc networking, other wireless technologies can also be used for general-purpose wireless connectivity, such as Zigbee, UPnP, etc.

For purposes of discussion, ad-hoc networking use cases will be described in the context of a multifunction printer (MFP), which are commonly used in homes and businesses. It will be understood that the concepts described relative to MFPs can be extended to other appliance-like electronic devices that are increasingly being adopted in private and public spaces. For example, devices like self-service information kiosks, vending machines, and point-of-sale terminals may also be conveniently placed and adapted in a fashion similar to MFPs, as described below.

Often, communications between multifunction printers and mobile devices may involve common tasks such as printing or scanning. In such a case, the tasks are typically performed using an existing wireless network, e.g., a home Wi-Fi local area network (LAN). For example, mobile phones running the Android operating system can print to MFPs using Mopria™ drivers, provided they share a wireless network connection. Alternatively, mobile phones running the iOS operating system can print to MFPs using AirPrint drivers, provided they share a wireless network connection. Unlike mobile phones, however, many sensors, small actuators and controllers do not support Wi-Fi or Wi-Fi direct communication as they have low power consumption requirements.

There exist MFPs with Bluetooth capability. However, these use the Bluetooth communication with the MFP to provide to the mobile device the network address of the MFP, following which the mobile device connects to the MFP over other wireless connections, e.g., Wi-Fi or Wi-Fi direct, to perform the print or scan workflows. In this disclosure, systems and methods are described that enable an MFP to interact with low-power peripheral devices in its neighborhood, as directed by the mobile device in its proximity, and executed entirely over the Bluetooth channel.

Traditionally, an MFP is used to perform print, scan, copy and email functions and is not used to communicate with other devices in its vicinity. This disclosure describes components that enable an MFP to connect with a wide array of Bluetooth-capable sensors, controllers and small actuators. The bidirectional Bluetooth communication capability on the MFP may need to be adapted, because the role played by the MFP in the MFP-to-mobile communication differs from that played in the MFP-to-other-devices communication.

In addition to enabling direct MFP access via Bluetooth, this disclosure relates to systems and methods that may also enable a multifunction printer or other device to execute additional workflows, such as reading nearby sensors, controlling nearby actuators, etc., as directed wirelessly by a mobile device that does not share a pre-existing network connection with said multifunction printer. The problem is solved by modifying the multifunction printer (MFP) to include the capability of communicating via Bluetooth or another suitable WPAN communication medium. One embodiment of this invention uses a Bluetooth communication channel.

Specifically, the Bluetooth communication capability should be designed in a way that the MFP communicates with the mobile device as a peripheral (slave), while it communicates with other devices in its vicinity, e.g., sensors, wearables, actuators and controllers, as a central (master). These peripheral and central roles are generally associated with Bluetooth Low Energy (BLE) devices. The MFP is designed in such a way that it can either switch between master and slave functionality as required by specific workflows, or in such a way that it supports a plurality of Bluetooth connections, of which a subset of the available connections are joined in "slave" mode and other connections are joined in "master" mode.

In FIG. 1, a diagram shows an example of how a mobile device 100 interacts with an MFP device 102 according to an example embodiment. The MFP device 102 is labeled as a hub in that it provides a centralized location to access other devices, represented here as controlled devices 104-106. Generally, the controlled devices 104-106 may be relatively simple "Internet-of-things" devices with limited user interface capability, e.g., no displays or switches and/or that are difficult to physically access once deployed. Examples of the controlled devices may include lights, sensors, cameras, controllers, actuators, displays, etc.

The mobile device 100 communicates with the hub device 102 whenever the hub device 102 and mobile device 100 are in close physical proximity. The communication between the mobile device 100 and the hub device 102 is accomplished without the devices sharing any pre-existing network connection, such as a home wireless connection or an enterprise network connection. Communication amongst the hub device 109 and the controlled devices 104-106 may require a common setup to establish a secure network among those devices. Communication amongst the mobile device 100 and controlled devices 104-106 is controlled or mediated by the hub device 109

There are three classes of devices shown in FIG. 1. One class of devices is represented by the controlled devices 104-106, which may include sensors, controllers and actuators that are capable of connecting to the hub device 102 and serving as Bluetooth peripheral devices. Another class of device is the mobile device 100 with Bluetooth communication capability, which is capable of serving as a Bluetooth central device. The hub device 102 is capable of serving as a Bluetooth central device as well as a Bluetooth peripheral device. Concretely, during the communication between the hub device 102 and the mobile device 100, the hub device 102 serves as the Bluetooth peripheral (slave) while the mobile device serves as the Bluetooth central device (master). Further, during the communication between the hub device 102 and the controlled devices 104-106 in the vicinity, the hub device 102 serves as the central device (master) while the controlled devices 104-106 serve as the peripherals (slaves).

In one scenario, the hub device 102 connects to a controlled device (e.g., device 104) via a first proximity network link 108. This link 108 is Bluetooth in this example, but may alternatively include other proximity network links, e.g., Wi-Fi direct, Zigbee, etc. The hub device 102 is connected as a master of the controlled device, as indicated by Bluetooth master functional block 110 in the hub device 102. The controlled device 104 will have an associated slave functional block 111. The hub device 102 is connected with the mobile device 100 via Bluetooth link 112. The mobile device is connected as a master of the hub device, as indicated by Bluetooth slave functional block 114 in the hub device 102.

The hub device 102 has specific computing capabilities beyond only establishing the connection and mediating between the wireless devices at both sides. For example, the hub device 102 has the ability to authenticate the mobile device 100 to determine credentials and access permissions relative to the peripheral device 104. The credentials and access permissions may be associated with a user 118 of the mobile device 100, e.g., using a password, passcode, biometrics, etc., that verify an existing access permission. In other cases, a token that is not associated with a particular user may be used to authenticate, e.g., a one-time-use code, an RFID tag, or a physical token such as a coin, key, etc.

The mobile device's access to the controlled device 104 from the hub device 102 via the second Bluetooth link 112 is determined by the credentials and access permissions. The hub device 102 has access to a local database 120 in which it stores a list of authorized users, credentials of each authorized user and the access permissions for each authorized user. This database 120 may also include data used to validate tokens or other data that is not associated with a particular user. The access permissions specify which mobile device user can access which peripheral devices and when. To make any updates to the database 120, a system administrator may physically approach the hub device 102, authenticate with his credentials and proceed to make the desired changes.

In another embodiment, the access control database is located in an external networked database 121 maintained by a system administrator, and is accessible by the hub device 102 over an existing wireless or wired connection 126. This provides a convenient means for a system administrator to access the database over the network 127 (e.g., a local or wide-area network) and make any necessary modifications. Note that, in this embodiment, only the access database 121 and the hub device 102 communicate over the existing network connection 126, while the mobile device and the peripheral devices (sensors, actuators, controllers) do not share that existing network connection 126.

While the hub device 102 can perform initial Bluetooth pairing with any Bluetooth-capable mobile device, it does not allow any Bluetooth-capable mobile device to access the controlled devices 104-106. The mobile user 118 pairs with the hub device 102 either via the operating system of the mobile device or by opening a mobile app. After pairing, the user 118 will provide her credentials that are relayed to the hub device 102 over the Bluetooth communication channel. Only after the credentials are verified by the hub using information from the access database, can the user read or influence the state of controlled devices 104-106 connected to the hub device 102.

Generally, the hub device 102 may provide a service to the mobile device 100 via the second Bluetooth link 112, such as printing, scanning, turning lights on and off, reporting temperature and humidity, detecting paper in a paper tray, detecting nearby motion, measuring light levels, controlling a camera, controlling a vending machine, etc. In such a case, the controlled device 104 may be used to augment the service based on the credentials and access permissions. For example, the controlled device 104 may include a locker, dispenser or vending machine in which items such as manila folders, envelopes, paperclips, or other office products may be provided as needed for the print job. In an office environment, this dispensing based on a specific authorization may help track the use of office supplies for purposes such as managing costs and controlling inventory.

In some embodiments, augmenting the service may involve sensing environmental conditions such as temperature, pressure, and humidity, the number of occupants in the vicinity of the hub device 102, and parameters/state of the hub device 102, including condition of the toner cartridge, level of fullness of the paper trays, conditions of internal parts of the multifunction printer. Based on the sensed information, the hub device 102 may provide diagnostics and maintenance information and/or actuation of one or more devices.

For example, in response to a command sent to the hub device 102 from a maintenance app 130 on the mobile device 100, the controlled device 104 may be a Bluetooth-capable lamp that can be switched on to direct a human operator to a drawer containing paper or toner supplies when such supplies run low. As another example, Bluetooth-capable lamps can be placed at different access ports or doors of the hub device 102 to help a human operator service, maintain or repair certain portions of the hub device 102, e.g., in response to a paper jam.

In another example, the peripheral devices 104-106 in the neighborhood of the hub device 102 may include sensors that monitor relevant environmental conditions, e.g., temperature and humidity, and employ the sensed data for the purpose of condition-based maintenance tasks, such as predicting time to failure or recommending a time to replace key internal components. This information is sent to authorized mobile devices 100 operated by service personnel when they are in the neighborhood of the hub device 102.

In another example, the controlled peripheral device 104 includes a Bluetooth-capable motion sensor or camera, and a Bluetooth-capable lamp. The Bluetooth-capable motion sensor or camera in the neighborhood of the hub device 102 can monitor occupancy of the room in which the hub device 102 is placed. If the room has been unoccupied for a specified length of time, the hub device 102 can switch off or reduce the brightness of the lamp to reduce power consumption. Analytics related to the room's occupancy are made available to an operator who enters the neighborhood of the hub device 102 with an authorized mobile device 100.

In another example, the controlled device 104 includes a Bluetooth-capable camera that is specialized, e.g., for taking identity card photos such as for a passport application. The user 118 can fill out a passport application or the like on the mobile device 100 (or transfer it to the mobile device 100 from another computer). The user 118 can print out the application on the MFP hub device 102 as well as having the application photos taken by the controlled device camera 104, and these photos may be printed via the hub device 102 or by another controlled device 105, 106 which uses special photo paper. Another of the controlled devices 105, 106 could be a display that allows the user to ensure the photo is of acceptable quality before printing.

In some cases, the hub device 102 may act as an intermediary between the mobile device 100 and the controlled device 104, passing along any commands from the mobile device 100 to the controlled device 104, and in response passing any responses, acknowledgments, requested data, etc., from the controlled device 104 back to the mobile device. In other cases, the hub device 102 may facilitate a handover between the mobile device 100 and the controlled device 104. For example, the hub device 102 may send information via the second Bluetooth link 112 that facilitates connecting the controlled device 104 with the mobile device 100 via a second local network interface, e.g., using Wi-Fi.

In cases where the hub device 102 intermediates between the mobile device 100 and the controlled device 104, the hub device 102 may only keep one of the connections 108, 112 open at a time. In other cases, the hub device 102 may be able to simultaneously maintain both connections 108, 112, as well as performing the operations in the functional blocks 110, 114 simultaneously. This hub device 102 may be able to simultaneously maintain additional connections, e.g., to other controlled devices 105, 106, as well as performing the operations in the functional blocks 110, 114 simultaneously for the other devices 105, 106.

The hub device 102 may be configured with a service that allows the mobile device 100 to choose from more than one of the controlled devices 104-106. For example, the hub device 102 may connect to one or more additional controlled devices 105, 106 via additional Bluetooth links 122, 124 such that the hub device is connected as a master of the one or more additional controlled devices 105, 106. The mobile device's access to the one or more additional controlled devices 105, 106 can be controlled from the hub device 102 via the additional Bluetooth links 122, 124 based on the credentials and access permissions. The hub device 102 may provide to the mobile device 100 a list of controlled devices, including the controlled device 104 and the additional controlled devices 105, 106. The list facilitates selecting the devices 104-106 for access by the mobile device 100.

The embodiments described above do not require the controlled devices 104-106 to communicate with a home/enterprise wireless network but to communicate only with the hub device 102 over an established secure network. An advantage of this approach, with respect to Internet connectivity, is that it avoids network administration overhead involved in configuring the hub device 102, a potentially large number of individual controlled devices 104-106 and the mobile device 100. Alternatives to these embodiments may involve other wireless communication modalities used by the hub device 102 and the controlled devices 104-106 (sensors, actuators and controllers). For example, the controlled devices 104-106 may communicate with the hub device 102 using a different proximity network technology such as Wi-Fi Direct, or Zigbee instead of or in addition to Bluetooth. If an alternate proximity link is used, the hub device 102 still communicates with the mobile device 100 over a Bluetooth channel 112.

In proximity-based communication systems today, the role of Bluetooth-capable components is fairly well established. For example, consider the case of a smartphone communicating with a wearable device such as a fitness tracker. The wearable device is a Bluetooth Low Energy peripheral, while the smartphone is a Bluetooth Central device. As another example, in the case of a smartphone communicating with a Bluetooth Low Energy advertising beacon, the smartphone serves as a Bluetooth Central Device and the beacon serves as a Bluetooth Low Energy Peripheral.

In contrast, as described in the embodiment, the hub device 102 is able to perform dual roles for a single workflow that involves the mobile device 100 and controlled devices 104-106. For example, in the communication with the controlled devices 104-106 (sensors, actuators, controllers), the hub serves as the Bluetooth Low Energy Central device. In the communication with the mobile device, it serves as a Bluetooth Classic (also referred to as Bluetooth Serial) peer or a Bluetooth Low Energy (BLE) Peripheral device. A communication architecture including the mobile device 100, the hub device 102 and the peripheral devices 104-106 can be constructed without using any pre-existing wireless connection amongst the mobile device 100 and the peripheral devices 104-106 provided that the hub device 102 can either switch between Central (Master) and Peripheral (Slave) roles or perform both Central and Peripheral roles simultaneously to controlled or mediate the communication between the mobile device 102 and the peripheral devices 104-106.

Figure 2:
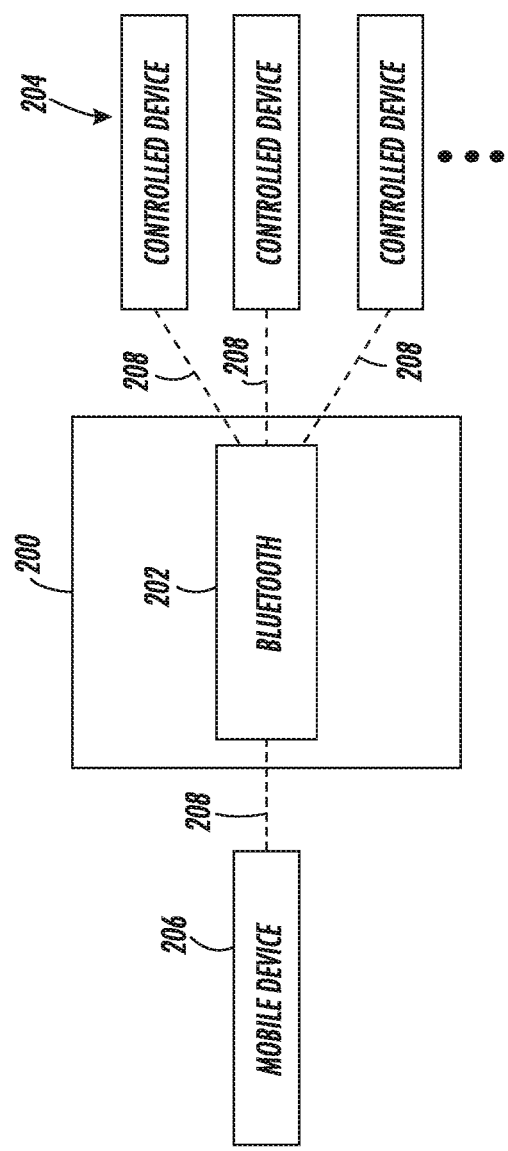
FIG. 2 is a block diagram of a hub device according to an example embodiment.

In FIG. 2, a block diagram illustrates a hub device 200 according to an example embodiment. The hub device 200 has a single Bluetooth communication module 202 that switches between Central and Peripheral roles depending upon whether it is communicating with nearby controlled/peripheral devices 204 or a nearby mobile device 206. The dashed lines 208 indicate that any of these connections may be active at a given time, but only one at a time. The switching between connections 208 can be performed in an opportunistic manner as directed by the mobile device 206. Instead of or in addition to connections 208 being activated by the mobile device 206, connections 208 can be activated according to a periodic rotation and/or according to a schedule determined by the system administrator.

Figure 3:
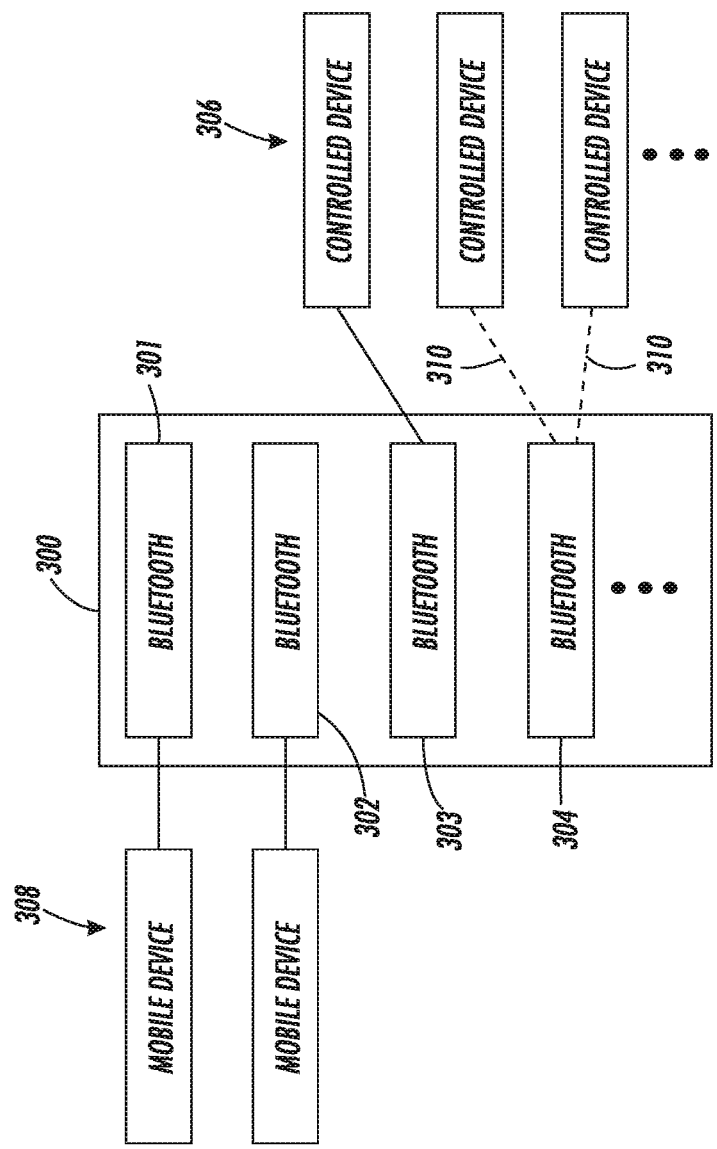
FIG. 3 is a block diagram of a hub device according to another example embodiment.

In FIG. 3, a block diagram illustrates a hub device 300 according to an example embodiment. In this embodiment, the hub device 300 has a plurality of Bluetooth communication modules 301-304. These modules 301-304 may include different hardware modules (e.g., radios, antennas, firmware) and different software modules (e.g., Bluetooth communication stacks, application interfaces). A subset of these modules (e.g., modules 303 and 304) may always be performing the Central roles and communicate with the controlled/peripheral devices 306. A complementary subset (e.g., modules 301 and 302) may perform the Peripheral roles and always be communicating with the mobile devices 308. As indicated by dashed lines 310, the module 304 may potentially connect to more than one controlled device 306, e.g., as needed based on mobile device request, according to a schedule, etc.

Figure 4:
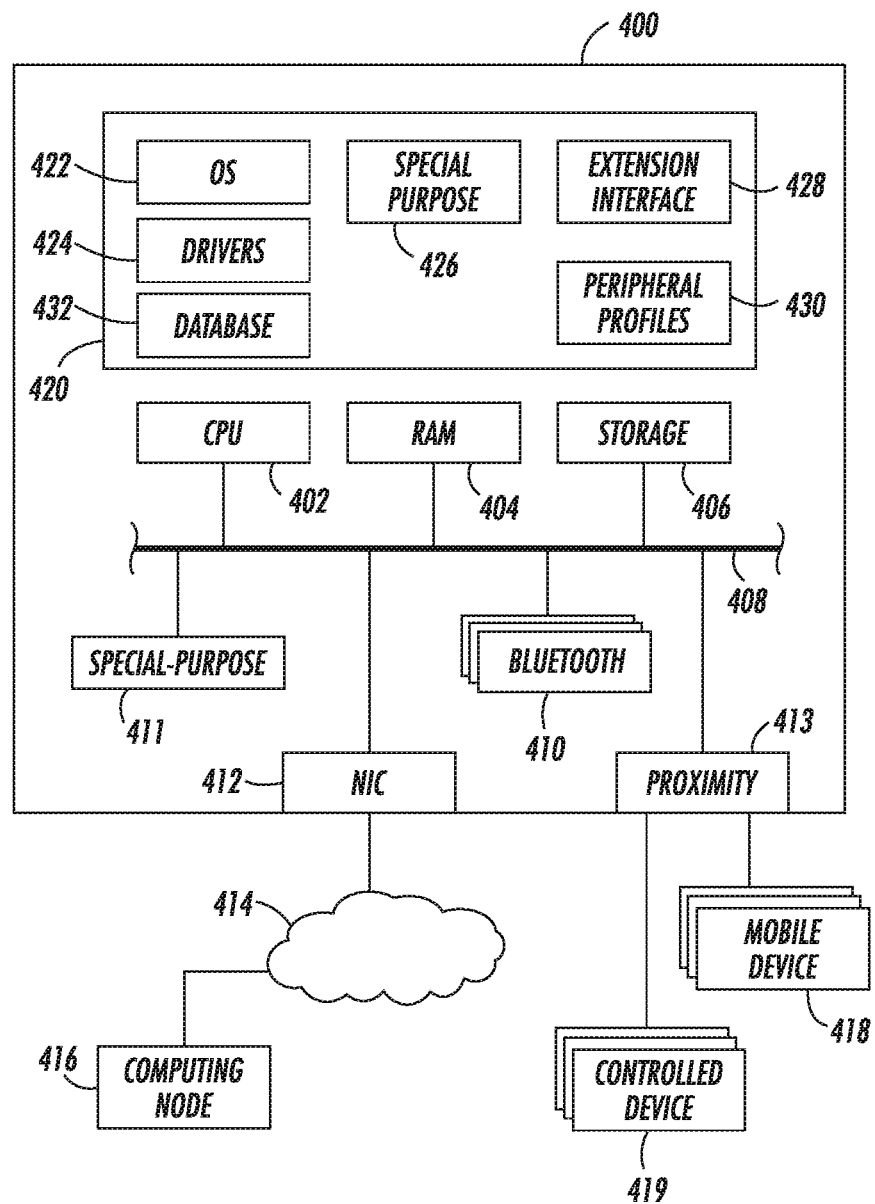
FIG. 4 is a block diagram of an apparatus according to an example embodiment.

Generally, the hub device as described herein can be implemented in conventional or custom processing hardware, e.g., personal computers, servers, routers, printers, gateways, embedded devices, mobile devices, etc. In FIG. 4, a block diagram shows an apparatus 400 that may be used as a hub device according to an example embodiment. The apparatus 400 includes one or more processors 402 such as a central processing unit, co-processor, digital signal processor, etc. The processor 402 is coupled to memory, which may include both random access memory 404 and persistent storage 406, via one or more input/output busses 408. Other general-purpose or special-purpose hardware may be coupled to the bus 408, such as Bluetooth modules 410, special-purpose hardware 411, network interface 412, and proximity network interface 413.

The network interface 412 facilitates communications via a network 414 with another Internet computing node 416, using wired or wireless media. The computing node 416 may be a remote authentication server, remote management terminal, remote logger, etc., as described elsewhere herein. The network 414 may include a combination of local area links and wide area communications backbones. The proximity network interface 413 facilitates communications with one or more mobile devices 418 that are in proximity, e.g., within wireless communication range. The proximity network interface 413 also facilitates communications with proximate controlled devices 419.

The illustrated proximity network interface 413 is intended to be generic, and may include multiple antennas, radio frequencies, modulation and encoding schemes, and different protocols for multiple types of proximity networks. The proximity network interface 413 includes at least Bluetooth capability, as indicated by the one or more Bluetooth modules 410. The Bluetooth modules 410 may be custom circuitry modules that include both radio frequency sections and firmware. While not shown, other proximity network modules may be included as part of the proximity network interface 413, including Wi-Fi, infrared, and near-field communications (NFC).

The apparatus 400 includes software 420 that facilitates communications between mobile devices 418 and controlled devices 419. The software 420 includes an operating system 422 and drivers 424 that facilitate communications between user-level programs and the hardware, as well as managing at least some layers of the network communications protocols. The software 420 may include specialized software components, such as a special-purpose functional module 426 which controls special-purpose hardware 411. If the apparatus 400 is configured as an MFP, for example, then the special purpose hardware may include paper feed mechanisms, imaging devices (e.g., photoreceptor drum, inkjet head, fuser), optical scanner, document feeder, user input and output devices, etc. The special purpose software 426 is configured to control the hardware 411 and configured to interact with the user.

The software 420 also includes an extension interface 428 that generally deals with extending the functionality of the apparatus 400 through the controlled devices 419. The extension interface 428 binds the special-purpose functionality of software 426 with additional functions and features enabled by the controlled devices 419. This may be implemented as described above, such as controlling lights or other indicators as an enhancement of MFP functionality for purposes of user convenience or machine servicing. The apparatus 400 may include a set of peripheral profiles 430 that are associated with various ones of the controlled devices 419. The coupling of a particular controlled device 419 may cause an associated profile 430 to be activated, as well as particular functionality of the extension interface 428. The software 420 also includes a database 432 which tracks user identities and permissions associated with those users.

Figure 5:
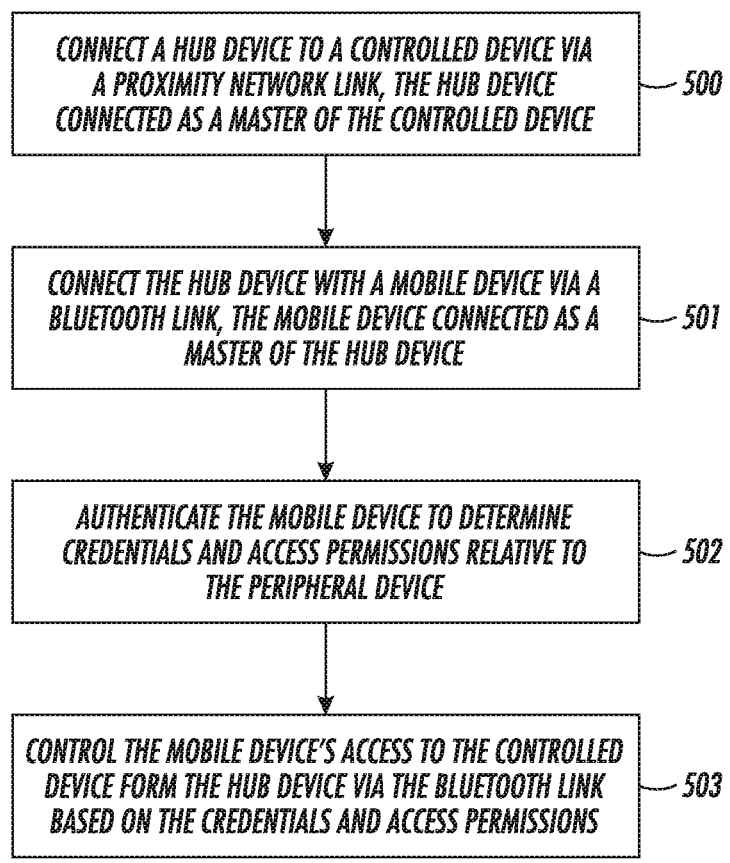
FIG. 5 is a flowchart of a method according to an example embodiment.

In FIG. 5, a flowchart shows a method according to an example embodiment. The method involves connecting 500 a hub device to a controlled device via a proximity network link. The hub device is connected as a master of the controlled device. The hub device is connected 501 with a mobile device via a Bluetooth link. The mobile device is connected as a master of the hub device. The mobile device is authenticated 502 to determine credentials and access permissions relative to the peripheral device. The mobile device's access to the controlled device is controlled 503 from the hub device via the Bluetooth link based on the credentials and access permissions.

In summary, a hub device is capable of communicating with a mobile device and a plurality of controlled devices, e.g., sensors, actuators and controllers in its physical neighborhood, over a Bluetooth channel. The communication between the hub device and the mobile device, as well as existing device workflows (e.g., copy, print, scan and email in an MFP), are accomplished by setting the hub device in Bluetooth peripheral (slave) mode and the mobile device in Bluetooth central (master) mode.

The communication between the hub device and the controlled devices, as well as novel workflows based on data gathering and device actuation are accomplished by setting the hub device in Bluetooth central mode and each controlled device in Bluetooth peripheral mode. The hub device switches between Bluetooth central and peripheral modes depending upon whether it is communicating with the mobile device or with the peripheral devices. The hub device enables only authorized mobile device users to read or affect the state of the controlled devices based on a database of authorized users.

The various embodiments described above may be implemented using circuitry, firmware, and/or software modules that interact to provide particular results. One of skill in the art can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not by this detailed description, but rather determined by the claims appended hereto.

The invention claimed is:

1. A method, comprising:
    connecting a multifunction printer to a controlled device via a proximity network link, the multifunction printer connected as a master of the controlled device;
    connecting the multifunction printer with a mobile device via a Bluetooth link, the mobile device connected as a master of the multifunction printer;
    providing a multifunction printing service to the mobile device via the Bluetooth link, the multifunction printing service comprising at least one of copying, printing, scanning, and emailing;
    authenticating the mobile device to determine credentials and access permissions relative to the controlled device; and
    controlling the mobile device's access to the controlled device from the multifunction printer via the Bluetooth link based on the credentials and access permissions, wherein the access to the controlled device augments the multifunction printing service.

2. The method of claim 1, wherein the proximity network link comprises a second Bluetooth link, wherein the Bluetooth link and the second Bluetooth link are maintained simultaneously.

3. The method of claim 1, wherein the proximity network link comprises a Wi-Fi link.

4. The method of claim 1, wherein the credentials and access permissions are stored locally on the multifunction printer.

5. The method of claim 1, wherein augmenting the multifunction printing service further comprises:
    sensing information that includes at least one of: environmental conditions; occupants in a vicinity of the multifunction printer; and a state of the multifunction printer; and
    based on the sensed information, actuating the controlled device to augment the multifunction printing service.

6. The method of claim 5, wherein the controlled device comprises a lamp that directs a human operator to supplies for the multifunction printer or to access ports of the multifunction printer to facilitate maintenance of the multifunction printer.

7. The method of claim 5, wherein the occupants in the vicinity of the multifunction printer are sensed via a motion sensor or camera that is connected as a second controlled device to the multifunction printer, the multifunction printer connected as a master of the second controlled device.

8. The method of claim 1, wherein controlling the mobile device's access to the controlled device comprises sending information to the mobile device via the proximity network link that facilitates connecting the mobile device with the controlled device via a second local network interface.

9. The method of claim 1, further comprising:
    connecting the multifunction printer to one or more additional controlled devices via additional proximity network links, wherein the multifunction printer is connected as a master of the one or more additional controlled devices;
    controlling the mobile device's access to the one or more additional controlled devices from the multifunction printer via the additional proximity network links based on the credentials and access permissions; and
    providing to the mobile device a list of the controlled device and the additional controlled devices, the list facilitating selecting one of the controlled devices and the additional controlled devices for access by the mobile device.

10. The method of claim 1, wherein augmenting the multifunction printing service further comprises:
    sensing service personnel in a vicinity of the multifunction printer, the mobile device being an authorized mobile device of the service personnel;
    sensing environmental conditions via the controlled device; and
    based on the sensed environmental conditions and a state of the multifunction printer, providing diagnostics and maintenance information about the multifunction printer to the service personnel via the authorized mobile device.

11. A multifunction printer, comprising:
    a first hardware module configured to connect the multifunction printer to a mobile device via a first Bluetooth link;
    a second hardware module different from the first hardware module, the second hardware module being configured to connect the multifunction printer to a controlled device via a second Bluetooth link;
    a processor coupled to the first and second hardware modules and operable to:
        connect as a master of the controlled device via the second Bluetooth link;
        connect as a slave of the mobile device via the first Bluetooth link;
        authenticate the mobile device to determine credentials and access permissions relative to the controlled device;
        control the mobile device's access to the controlled device via the first Bluetooth link based on the credentials and access permissions.

12. The multifunction printer of claim 11, wherein the first Bluetooth link and the second Bluetooth link are maintained simultaneously.

13. The multifunction printer of claim 11, wherein the credentials and access permissions are stored locally on the multifunction printer.

14. The multifunction printer of claim 11, wherein the multifunction printer provides a multifunction printing service via the first Bluetooth link, the multifunction printing service comprising at least one of copying, printing, scanning, and emailing, the processor further operable to cause the controlled device to augment the multifunction printer service based on the credentials and access permissions.

15. The multifunction printer of claim 14, wherein augmenting the multifunction printer service further comprises:
    sensing information that includes at least one of: environmental conditions; occupants in a vicinity of the multifunction printer; and a state of the multifunction printer; and based on the sensed information, performing at least one of providing diagnostics and maintenance information about the multifunction printer and actuating one or more devices that augment the multifunction printing service.

16. The multifunction printer of claim 11, wherein controlling the mobile device's access to the controlled device comprises sending information via the first Bluetooth link to the mobile device that facilitates connecting the mobile device with the controlled device via a second local network interface.

17. The multifunction printer of claim 11, wherein the processor is further operable to:
   connect to one or more additional controlled devices via additional proximity network links, wherein the multifunction printer is connected as a master of the one or more additional controlled devices;
   control the mobile device's access to the one or more additional controlled devices via the additional proximity network links based on the credentials and access permissions; and
   providing to the mobile device a list of the controlled device and the additional controlled devices, the list facilitating selecting one of the controlled devices and the additional controlled devices for access by the mobile device.

18. The multifunction printer of claim 11, wherein the first and second hardware modules have respective different software modules.

19. A method comprising:
   connecting a multifunction printer with a mobile device via a first Bluetooth link using a first hardware module of the multifunction printer, the mobile device connected as a master of the multifunction printer;
   connecting the multifunction printer to a controlled device via a second Bluetooth link using a second hardware module of the multifunction printer different from the first hardware module, the multifunction printer connected as a master of the controlled device;
   authenticating the mobile device to determine credentials and access permissions relative to the controlled device; and
   controlling the mobile device's access to the controlled device from the multifunction printer via the first and second Bluetooth links based on the credentials and access permissions, wherein the first and second Bluetooth links are maintained simultaneously.

20. The method of claim 19, wherein the multifunction printer provides a service via the first Bluetooth link, the method further comprising causing the controlled device to augment the service via the second Bluetooth link based on the credentials and access permissions.

* * * * *